US006564585B2

(12) United States Patent
Abe et al.

(10) Patent No.: US 6,564,585 B2
(45) Date of Patent: May 20, 2003

(54) METHOD FOR PRODUCING A SECOND-ORDER NONLINEAR GLASS MATERIAL

(75) Inventors: Jun Abe, Annaka (JP); Seiki Ejima, Annaka (JP); Akira J. Ikushima, Nagoya (JP); Takumi Fujiwara, Nagoya (JP)

(73) Assignees: Shin-Etsu Chemical Co., Ltd., Tokyo (JP); Toyota Technological Institute, Nagoya (JP)

( * ) Notice: Subject to any disclaimer, the term of this patent is extended or adjusted under 35 U.S.C. 154(b) by 0 days.

(21) Appl. No.: 09/851,126

(22) Filed: May 9, 2001

(65) Prior Publication Data

US 2001/0019991 A1 Sep. 6, 2001

Related U.S. Application Data

(62) Division of application No. 09/511,716, filed on Feb. 23, 2000, now Pat. No. 6,380,109.

(30) Foreign Application Priority Data

Mar. 8, 1999  (JP) .............................................. 11-60519

(51) Int. Cl.[7] .............................................. C03C 21/00
(52) U.S. Cl. .............................. 65/30.1; 65/392; 65/399
(58) Field of Search .......................... 65/392, 394, 399, 65/425, 30.1, 30.13

(56) References Cited

U.S. PATENT DOCUMENTS 4,203,744 A  *  5/1980  Schultz et al. ................. 65/112
4,670,033 A  *  6/1987  Miura ............................. 65/22
5,325,230 A  *  6/1994  Yamagata et al. ........... 252/588
5,617,499 A      4/1997  Brueck et al.
5,679,125 A  * 10/1997  Hiraiwa et al. ............... 65/17.3
5,966,233 A     10/1999  Fujiwara et al.
6,097,867 A      8/2000  Brueck et al.
6,215,576 B1     4/2001  Minemoto et al.
6,221,565 B1     4/2001  Jain et al.
6,289,699 B1  *  9/2001  Kewitsch et al. ........... 264/1.25
6,311,542 B1  * 11/2001  Brennan et al. ............... 385/10

FOREIGN PATENT DOCUMENTS

WO      96/16344     5/1996
WO      98/14827     4/1998

OTHER PUBLICATIONS

Myers, et al, "Effect of hydrogen loading on temperature/electric–field poling of SiO2–based thin films on Si", Electronics Letters, vol. 31, No. 18, pp. 1604–1606, Aug. 1995.*

* cited by examiner

*Primary Examiner*—Sean Vincent
(74) *Attorney, Agent, or Firm*—Oliff & Berridge, PLC

(57) ABSTRACT

There is disclosed second-order nonlinear glass material wherein a part having second-order nonlinearity contains Ge, H and OH and has second-order nonlinear optical constant d of 1 pm/V or more, and a method for producing second-order nonlinear glass material comprising treating a porous glass material containing Ge with hydrogen, sintering it and subjecting it to a ultraviolet poling treatment. There can be provided second-order nonlinear glass material having second-order nonlinearity which is a sufficiently high and has a sufficiently long lifetime for a practical purpose, in use of the glass material for optical functional elements or the like.

4 Claims, 2 Drawing Sheets

METHOD FOR PRODUCING A SECOND-ORDER NONLINEAR GLASS MATERIAL

This is a Division of application Ser. No. 09/511,716 filed Feb. 23, 2000 now U.S. Pat. No. 6,380,109. The entire disclosure of the prior application(s) is hereby incorporated by reference herein in its entirety.

BACKGROUND OF INVENTION

1. Field of the Invention

The present invention relates to second-order nonlinear glass material and a method for producing it. More specifically, the present invention relates to a $SiO_2$ glass material having high second-order nonlinearity for a long period, and a method for producing it.

2. Description of the Related Art

Conventionally, there have been known optical functional elements such as optical switches, optical modulators, wavelength converter or the like, as an apparatus using second-order nonlinearity such as generation of secondary higher harmonics or the like. These are generally made by use of a crystalline material represented by $LiNbO_3$.

In an optical system in optical communication, optical measurement or the like, an optical fiber made of a $SiO_2$ glass material is used as a signal transmission line. Accordingly, considering connectivity with an optical fiber and cost performance, it is strongly required that the above-mentioned optical functional element is also made by use of a $SiO_2$ glass material in place of a crystalline material such as $LiNbO_3$.

However, a glass material does not inherently have second-order nonlinearity, because of inversion symmetry thereof. This is one of reasons why a glass material is used only for passive utility.

There is proposed a ultraviolet poling treatment method comprising subjecting a glass material to ultraviolet radiation and application of high electric field (poling) at the same time to afford second-order nonlinearity to the glass material. The method enables the glass material to express second-order nonlinearity that is comparable to $LiNbO_3$ crystalline. Accordingly, it is expected that the method enables a glass material to be used as a material for optical functional elements.

However, the second-order nonlinearity expressed in a glass material by the ultraviolet poling treatment is attenuated to about 40% of the initial value only after about 280 days at room temperature. Namely, there is a problem that the lifetime of the second-order nonlinearity is very short. The reason may be that the second-order nonlinearity expressed by destroying inversion symmetry by ultraviolet poling treatment is alleviated to be in an original state by thermal energy. Considering the period of use of optical functional elements, second-order nonlinearity need to have a lifetime of at least 10 years.

Accordingly, the most important subject in application of second-order nonlinear glass material to optical functional elements or the like is to prolong the lifetime of the second-order nonlinearity induced by the ultraviolet poling treatment.

The object of the present invention is to provide second-order nonlinear glass material having second-order nonlinearity which is a sufficiently high and has a sufficiently long lifetime for a practical purpose, in use of the glass material for optical functional elements or the like.

SUMMARY OF THE INVENTION

The present invention relates to second-order nonlinear glass material wherein a part having second-order nonlinearity contains Ge, H and OH and has second-order nonlinear optical constant d of 1 pm/V or more.

As described above, the glass material of the present invention is characterized in having a structure that a part having second-order nonlinearity contains Ge, H and OH. Namely, the glass material of the present invention has a structure that unpaired electron exists in a defect which is a cause of generation of second-order nonlinearity (called GeE' center) is terminated with H or the like. Such a structure can prevent GeE' center from being alleviated to be in an original state by thermal energy, and thus second-order nonlinearity can continue to be expressed for a long time. Furthermore, since the glass material has a large second-order nonlinear optical constant d of more than 1 pm/V or more, it can be applied to optical functional elements or the like.

Preferably, a period in which the second-order nonlinear optical constant d is decreased to 1/e of an initial value at room temperature in the above-mentioned second-order nonlinear glass material, is 15 years or more.

The above-mentioned glass material having second-order nonlinearity of long lifetime is suitable as a material for optical functional elements to be used for a long period.

The present invention also provides a method for producing second-order nonlinear glass material comprising treating a porous glass material containing Ge with hydrogen, sintering it and subjecting it to a ultraviolet poling treatment.

As described above, when hydrogen such as H is previously introduced in a glass material by a hydrogen treatment, unpaired electrons in a GeE' center generated by the ultraviolet poling treatment can be terminated with hydrogen cation. As a result, the GeE' center is prevented from being alleviated by thermal energy to be in an original state, and a glass material having second-order nonlinearity for a long period can be provided.

Preferably, the hydrogen treatment is conducted at a temperature of 800° C. or less in the above-mentioned method for producing second-order nonlinear glass material.

As described above, when the hydrogen treatment is conducted at a temperature of 800° C. or less as described above, Ge as a source of the GeE' center can be prevented from being volatilized as GeO. As a result, a sufficient amount of GeE' centers can be generated by the ultraviolet poling treatment, and a glass material having high second-order nonlinearity can be provided.

According to the present invention, the glass material is produced by conducting the hydrogen treatment before the ultraviolet poling treatment, and thus it is possible to last second-order nonlinearity of the resulting glass material for a long time. As a result, second-order nonlinear glass can be applied to optical functional elements such as optical switches.

DESCRIPTION OF THE INVENTION AND A PREFERRED EMBODIMENT

Figure 1:
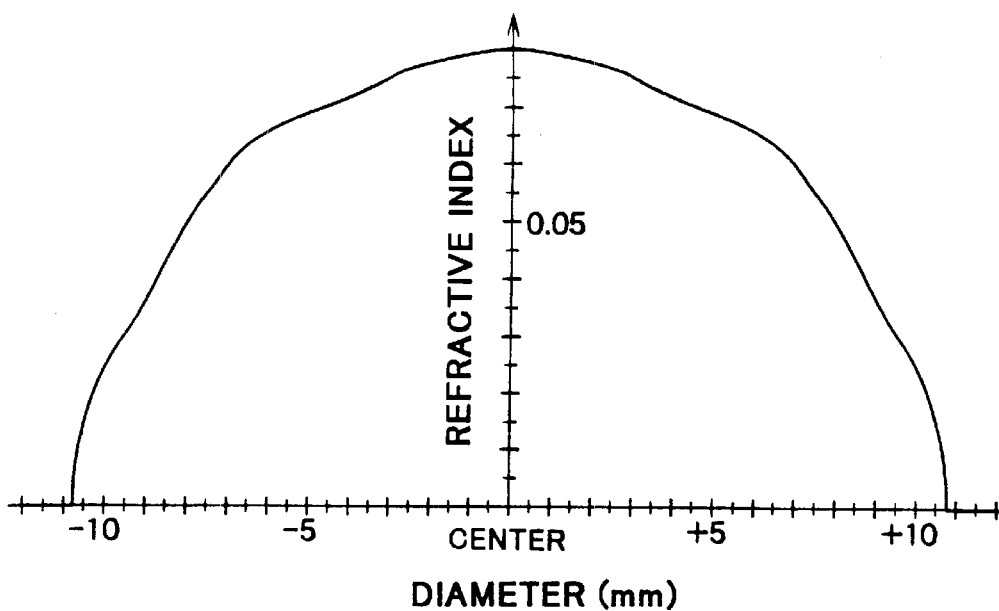
FIG. 1 is a refractive index profile of the glass material produced in Example 1.

The present invention will be further described below in detail, but is not limited thereto.

The second-order nonlinear glass material for the present invention is the material produced by subjecting the $SiO_2$ glass material containing Ge as a dopant (for example, core material for optical fiber) to the ultraviolet poling treatment explained below. According to the ultraviolet poling treatment, there can be expressed second-order nonlinearity of second-order nonlinear optical constant d or 1 pm/V or more. Namely, the above-mentioned GeE' center having unpaired electron as one of some defects relating to Ge is generated by the ultraviolet poling treatment. Conceivably, the GeE' center could function as an electric dipole or as a source of free electron, to express second-order nonlinearity.

The second-order nonlinear glass material of the present invention is characterized in containing H and OH or the like other than Ge at a part having second-order nonlinearity (specifically, GeE' center). Namely, the glass material of the present invention has a structure that unpaired electron contained in GeE' center is terminated with hydrogen cation such as H or OH or the like. Such a structure can prevent the GeE' center from being alleviated to be in an original state by thermal energy or the like, and thus it is possible to last second-order nonlinearity for a long time. Specifically, a period in which second-order nonlinear optical constant d is decreased to 1/e of an initial value at room temperature can be 15 years or more.

Hydrogen cation has the smallest atomic weight and ionic radius. Accordingly, it can be moved very easily to a generated GeE' center. Furthermore, it can be provided in glass in a sufficient amount, and is active as cation. Hydrogen cation is therefore the most suitable to terminate unpaired electron contained in the GeE' center.

In the composition of the glass material of the present invention, an amount of $GeO_2$ is, for example, 10 to 20% by weight.

Additives which are generally used for glass material for an optical fiber or the like such as $P_2O_5$, $Al_2O_3$ or the like can be added to the glass material of the present invention as other dopants.

In the method for producing second-order nonlinear glass material of the present invention, a porous glass material containing Ge is treated with hydrogen in the first step. The porous glass material containing Ge is, for example, a porous core material for an optical fiber. The porous core material can be produced, for example, by VAD (vapor-phased axial deposition) method or the like. Specifically, $SiCl_4$ glass raw material gas containing $GeCl_4$ as a dopant is hydrolyzed in oxyhydrogen flame to form glass fine particles (namely, $SiO_2$, $GeO_2$ or the like). Then, the generated glass particles are blown to a tip end of a starting material such as a glass rod or the like to be adhered and deposited thereon and a porous core material is grown. The porous core material by pulling the starting material can be produced in axis direction with growth of the porous core material, and depositing the glass fine particles continuously in axis direction.

Gas flow is, for example as follows: $SiCl_4$ gas: 5 to 50 $cm^3$/sec, $GeCl_4$ gas: 1 to 10 $cm^3$/sec, hydrogen gas: 50 to 300 $cm^3$/sec, oxygen gas: 50 to 500 $cm^3$/sec.

The producing method of the present invention characterized in treating the porous glass material with hydrogen. The hydrogen treatment enables hydrogen as a source of hydrogen cation which terminates unpaired electron at a GeE' center after the ultraviolet poling treatment to be introduced in the glass material. Furthermore, according to the hydrogen treatment, the —Ge—O—Ge bond is cleaved, to form a part where it is terminated with —GeOH, resulting in increase of the GeE' center, which may further increase second-order nonlinearity.

The hydrogen treatment can be conducted, for example, by exposing the porous glass material to hydrogen. More specifically, the porous glass material is exposed to, for example, a mixed gas flow of 0.1 to 1.5 L/minute of $H_2$ gas and 1 to 15 L/minute of an inert gas (He gas or the like) for sufficient time.

In that case, if the hydrogen treatment is conducted at too high temperature, $GeO_2$ as a dopant may be partly reduced to GeO which is liable to be volatilized. Accordingly, the hydrogen treatment is preferably at a temperature of 800° C. or less, especially at a temperature of 200° C. or less. Namely, when the hydrogen treatment is conducted at low temperature, $GeO_2$ can be prevented from being reduced to GeO. As a result, less Ge as a source of GeE' center is volatilized as GeO, and more GeE' center can be generated. Accordingly, the glass material having high second-order nonlinearity can be produced.

Then, the porous glass material treated with hydrogen is sintered to be a glass material. Sintering is conducted, for example, by heating the porous glass material at 1500° C. or higher. In that case, if necessary, sintering is conducted in an atmosphere of a halogen compound such as chlorine gas or the like to conduct dehydration at the same time.

Then, the ultraviolet poling treatment is conducted. Namely, the glass material is subjected to ultraviolet irradiation and application of high electric field at the same time. A light source of ultraviolet irradiation is, for example, an excimer pulse laser such as ArF. Irradiation dose of ultraviolet light is, for example, 500 to 1500 $kJ/cm^2$. The electric field strength is, for example, 15 to $10^5$ V/cm.

The second-order nonlinear glass material expressing high second-order nonlinearity for a long period can be produced in accordance with the above-mentioned producing method of the present invention. Specifically, the second-order nonlinear glass material having second-order nonlinear optical constant d of 1 pm/V or more wherein a period in which second-order nonlinear optical constant d is decreased to 1/e of the initial value at room temperature is 15 years or more can be produced.

EXAMPLE

The present invention will be explained with the following examples.

Example 1

A porous core material for an optical fiber produced by a conventional VAD method ($GeO_2$ concentration of 10% by weight) was exposed to a mixed gas flow of 0.5 L/min of $H_2$ gas and 5.0 L/min of He gas at 200° C. for sufficient time.

Then, the porous core material treated with hydrogen was sintered at an atmosphere where 3.0 L/min of He gas was flown at 1600° C. to yield a glass material.

The refractive index profile in a diameter direction of the resulting glass material was shown in FIG. 1. As shown in FIG. 1, almost no Ge was volatilized.

Then, the above-mentioned glass material was subjected to the ultraviolet poling treatment to provide second-order nonlinear glass material of the present invention. Namely, the glass material obtained above was subjected to ultraviolet irradiation using ArF excimer pulse laser (wave length of 193 nm) as a ultraviolet light source, at a optical intensity of 100 $mj/cm^2$ per pulse. 10 pulses per second, and 10,000 pulses in total, of ultraviolet light were irradiated. $3\times10^5$ V/cm of electric field was applied during ultraviolet irradiation.

Example 2

A glass material was produced by the same method as Example 1 except that the hydrogen treatment was conducted at a temperature of 500° C.

Figure 2:
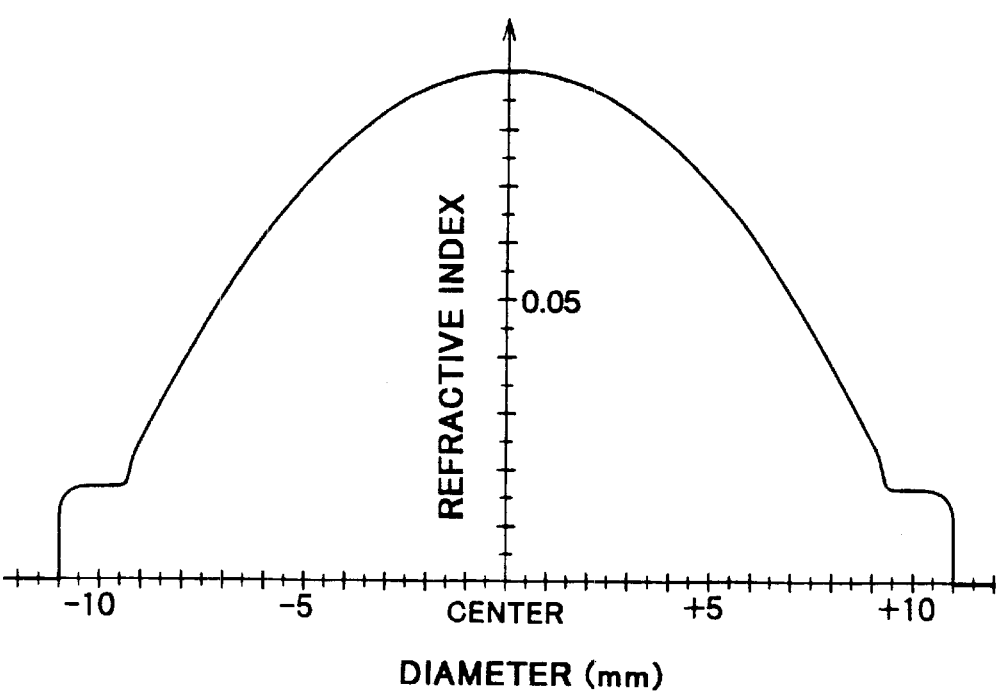
FIG. 2 is a refractive index profile of the glass material produced in Example 2.

The refractive index profile in a diameter direction of the resulting glass material was shown in FIG. 2. As shown in FIG. 2, Ge was slightly volatilized.

Then, the above-mentioned glass material was subjected to the ultraviolet poling treatment by the same method as Example 1 to provide second-order nonlinear glass material of the present invention.

Comparative Example 1

A glass material was produced by the same method as Example 1 except that hydrogen treatment was not conducted.

(Determination of Lifetime of Second-Order Nonlinearity)

Figure 3:
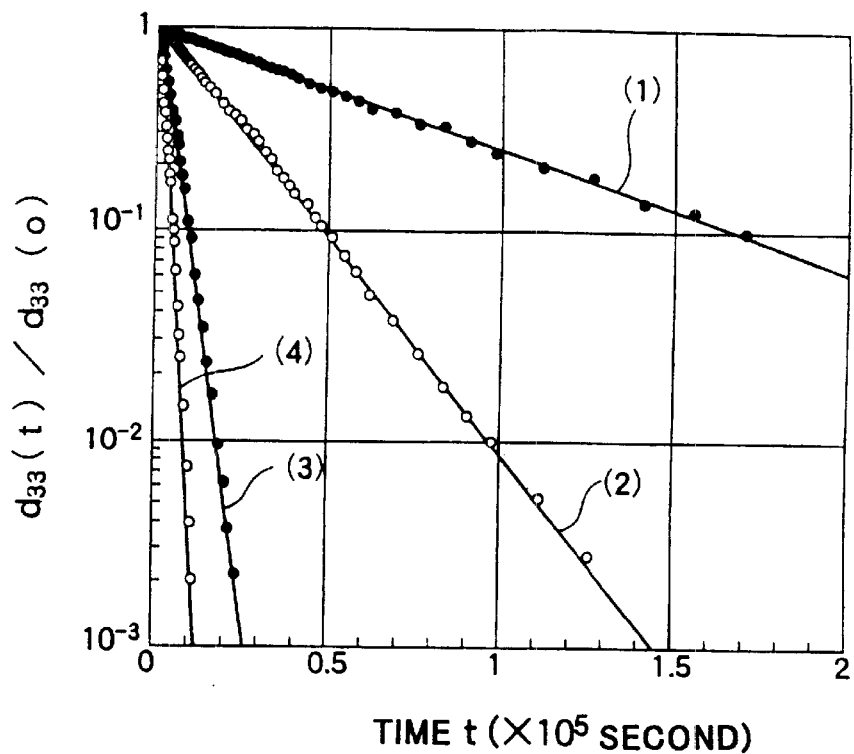
FIG. 3 shows a relation between a time for keeping temperature t at each temperature T and attenuation of $d_{33}$ constant.

Each of the second-order nonlinear glass materials produced in Example 1 was kept at each temperature of T=250° C., 320° C., 430° C., and 500° C. for a certain time (t), and attenuation of $d_{33}$ constant was measured. Measurement of $d_{33}$ constant was conducted by a conventional method using the generation of secondary higher harmonics. The results were shown in FIG. 3. In FIG. 3, a scale in an axis of ordinate shows a ratio of $d_{33}$ constant after time (t) (namely, $d_{33}$ (t)) to the initial value of $d_{33}$ constant (namely, $d_{33}(0)$) in logarithmic scale.

As shown in FIG. 3, good straight lines (1) to (4) was obtained in all temperature region at which measurement was conducted. This means that attenuation of $d_{33}$ constant is single exponential, and the attenuation is depending on only one factor.

Figure 4:
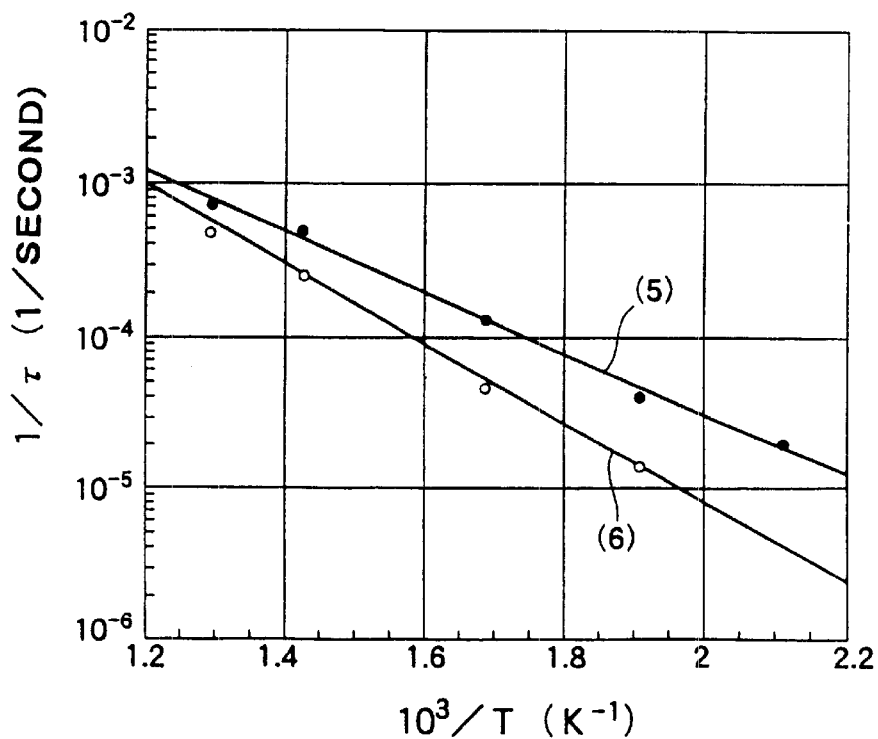
FIG. 4 shows a relation between temperature T and time constant $\tau$.

Then, time constant $\tau_T$ at each temperature T was determined by using each gradient of lines (1) to (4) in FIG. 3. Then, each of ($10^3$/T, $1/\tau_T$) was plotted, and the relation between temperature and time constant was determined. For comparison, the glass material produced without hydrogen treatment in Comparative Example 1 was determined in a similar manner to the above. The results were shown in FIG. 4. As shown in FIG. 4, both of the line (5) and the line (6) were well straight. The time constant $\tau$ represents time required for attenuation of d constant to 1/e of the initial value d(0) (namely, about 36.8%).

In FIG. 4, when the line (5) for the glass material treated with hydrogen was extrapolated to a room temperature ($10^3$/T=$10^3$/290=3.4) to determine $\tau$, $\tau$ was about 16 years. Namely, it has been found that it takes about 16 years or more to attenuate the second-order nonlinear optical constant d to 1/e of the initial value in the second-order nonlinear glass material treated with hydrogen, and therefore the lifetime of the second-order nonlinearity is very long.

FIG. 4 is a graph called as so-called Arrhenius plot chart, which shows $\tau$ (time) required for being counterpoised at each temperature (namely, each thermal energy). Activation energy for the glass material to be alleviated to be in an original state (namely, barrier energy) was determined by using the gradient of the line. Larger activation energy means more difficulty to be alleviated to be in an original state. Activation energy of each glass material was determined by using the gradient of the lines (5) and (6). As a result, the activation energy of the second-order nonlinear glass material produced with conducting the hydrogen treatment of the present invention was about 0.52 eV. The activation energy of the second-order nonlinear glass material of Comparative Example 1 produced without conducting the hydrogen treatment was about 0.41 eV. It was found from the results that the glass material produced with conducting the hydrogen treatment was hardly alleviated to be in an original state, compared to the glass material of Comparative Example 1 produced without conducting the hydrogen treatment. Namely, in the glass material of the present invention, second-order nonlinearity is hardly alleviated and has a long lifetime.

The present invention is not limited to the above-described embodiment. The above-described embodiment is a mere example, and those having the substantially same structure as that described in the appended claims and providing the similar action and effects are included in the scope of the present invention.

What is claimed is:

1. A method for producing second-order nonlinear glass material comprising treating a porous glass material containing Ge with hydrogen, sintering it and subjecting it to a ultraviolet poling treatment.

2. The method for producing second-order nonlinear glass material according to claim 1 wherein the hydrogen treatment is conducted at a temperature of 800° C. or less.

3. The method for producing second-order nonlinear glass material according to claim 1, wherein the porous glass material comprises $SiO_2$ as a main component.

4. The method for producing second-order nonlinear glass material according to claim 2, wherein the porous glass material comprises $SiO_2$ as a main component.

* * * * *